United States Patent [19]

Hansen

[11] Patent Number: 4,526,555
[45] Date of Patent: Jul. 2, 1985

[54] DRIVE COUPLING ASSEMBLY

[75] Inventor: Loren F. Hansen, Lincoln, Nebr.

[73] Assignee: Outboard Marine Corporation, Waukegan, Ill.

[21] Appl. No.: 488,269

[22] Filed: Apr. 25, 1983

[51] Int. Cl.³ .............................. F16D 3/00; F16D 3/60
[52] U.S. Cl. .................................... 464/149; 464/106; 464/137; 464/904
[58] Field of Search ................. 464/51, 106, 137, 138, 464/147, 149, 153–156, 102, 160, 71, 104, 73, 903, 904

[56] References Cited

U.S. PATENT DOCUMENTS

| | | | |
|---|---|---|---|
| 1,528,433 | 3/1925 | Kay | 464/102 |
| 1,923,307 | 8/1933 | Hathaway | 464/149 |
| 2,552,682 | 5/1951 | Lopez | 464/160 |
| 2,743,592 | 5/1956 | Nagy | 464/149 |
| 2,802,350 | 8/1957 | Ottaway | 464/106 |
| 2,852,924 | 9/1958 | Allen | 464/106 |
| 3,044,281 | 7/1962 | Smith | 464/71 |
| 3,438,221 | 4/1969 | Paulsen | 464/104 X |
| 3,823,576 | 7/1974 | Colletti et al. | 464/138 X |
| 3,879,959 | 4/1975 | Clampett | 464/73 |
| 4,312,193 | 1/1982 | Gibbs et al. | 464/149 X |

Primary Examiner—John Petrakes
Attorney, Agent, or Firm—Michael, Best & Friedrich

[57] ABSTRACT

The drive coupling assembly, which is adapted to drivingly connect together a drive member mounted for rotation about a first axis and a driven member mounted for rotation about a second axis generally coaxially with the first rotational axis, has identically arranged torque transmitting members mounted on the drive and driven members and connected together by a pair of resilient members extending transversely of the rotational axes. Each transmitting member includes a base portion for mounting on the associated drive member and driven member, first and second opposed wall sections extending axially from the base portion in spaced, parallel relationship on the opposite sides of the rotational axes. A first axially extending projection on the first wall section of one torque transmitting members extends in spaced, parallel relationship to a corresponding first axially extending projection on the first wall section of the other torque transmitting member. A second axially extending projection on the second wall of one torque transmitting member extends in spaced, parallel relationship to a corresponding second axially extending projection on the second wall section of the other torque transmitting member. The opposite ends of the resilient members are respectively mounted on the first and second projections so that torque is transmitted from the drive member to the driven member through compression of the resilient members. The wall sections terminate in edges which are spaced apart to permit limited rotational movement of one torque transmitting member relative to the other.

11 Claims, 5 Drawing Figures

U.S. Patent    Jul. 2, 1985    4,526,555
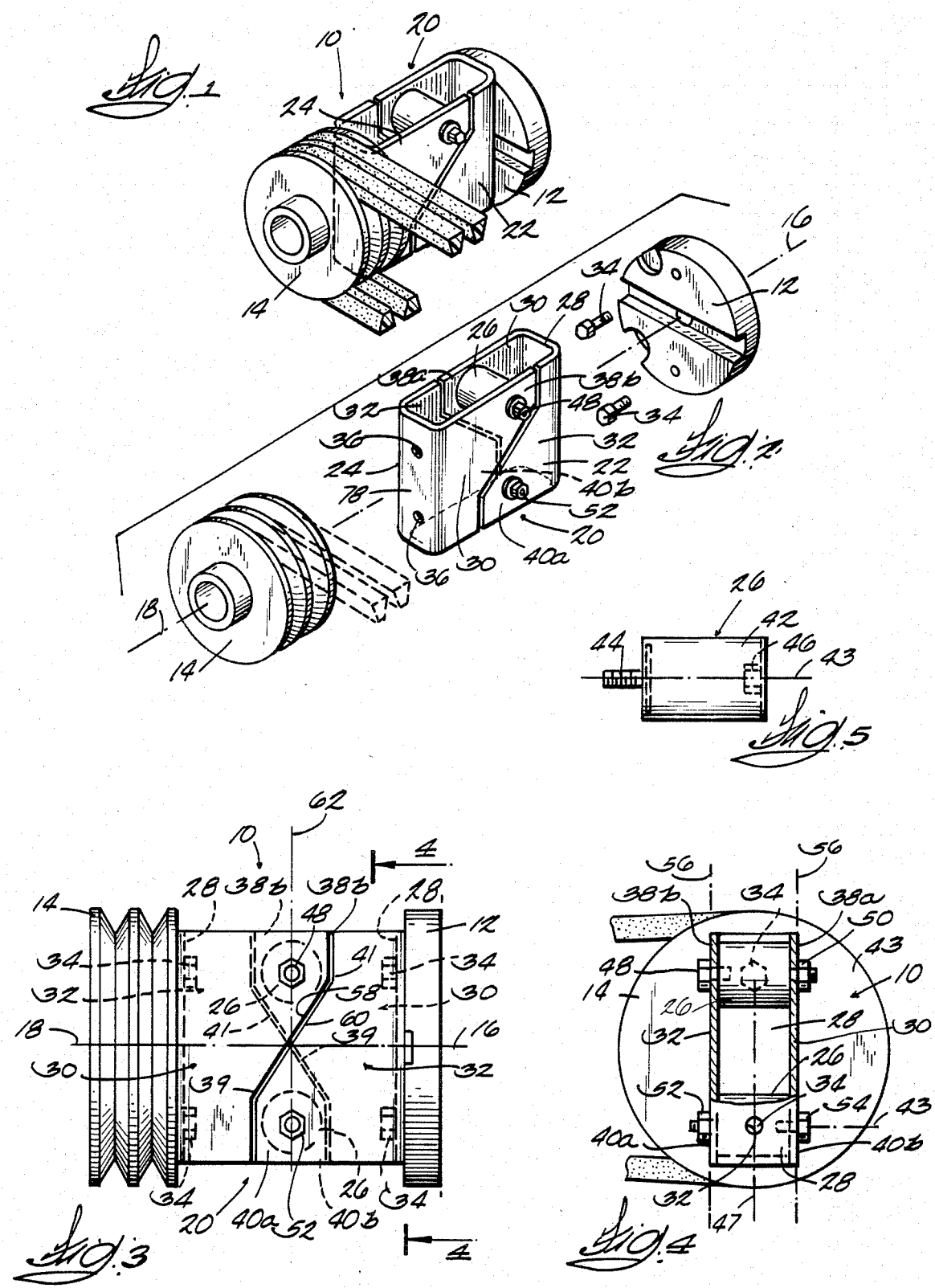

DRIVE COUPLING ASSEMBLY

BACKGROUND OF THE INVENTION

This invention relates to drive coupling assemblies and, more particularly, to drive coupling assemblies for drivingly connecting together rotatable drive and driven members and having the capability of accommodating axial and/or angular misalignment between the rotational axes of the drive and driven members.

In some drive arrangements, a rotatable drive member, such as an adapter connected to an engine fly wheel, is drivingly connected to a rotatably driven member, such as a clutch pulley, through a drive coupling assembly. The rotational axis of the drive member can be radially and/or angularly misaligned with the rotational axis of the driven member because of manufacturing tolerances and the like. Consequently, the coupling assembly drivingly connecting together the drive and driven members must be capable of accommodating such misalignment. Universal joints, flexible plate arrangements, and axially extending elastomeric mounts have been used for this purpose. Many of these prior drive coupling assemblies require considerable space and/or are quite expensive. Also, some are not particularly effective in accommodating backlash.

Attention is directed to the following United States Patents which exemplify prior drive coupling assemblies:

| Patentee | U.S. Pat. No. | Issue Date |
|---|---|---|
| Kay | 1,528,433 | March 3, 1925 |
| Lopez | 2,552,682 | May 15, 1951 |
| Ottaway | 2,802,350 | August 13, 1957 |
| Smith | 3,044,281 | July 17, 1962 |
| Paulsen | 3,438,221 | April 15, 1969 |
| Colletti et al. | 3,823,576 | July 16, 1974 |
| Clampett | 3,879,959 | April 29, 1975 |

SUMMARY OF THE INVENTION

The drive coupling assembly provided by the invention is adapted to drivingly connect together a drive member mounted for rotation about a first axis and a driven member mounted for rotation about a second axis generally coaxial with the first rotational axis. The drive coupling assembly includes a first torque transmitting member adapted for connection to the drive member for common rotation therewith and having a first connection portion radially spaced from the first rotational axis and extending axially toward the driven member, a second torque transmitting member adapted for connection to the driven member for common rotation therewith and having a second connection portion radially spaced from the second rotational axis and extending axially toward the drive member in radially spaced relationship with the first connection portion, a resilient member extending between the first and second connection portions transversely of the rotational axes, and means fixedly mounting the opposite ends of the resilient member on the first and second connection portions at locations radially spaced from the rotational axes such that torque is transmitted from the drive member to the driven member through the resilient member.

In one embodiment, the drive coupling assembly includes means for limiting the amount of rotational movement of the first torque transmitting member relative to the second torque transmitting member.

In one embodiment, the drive coupling assembly includes a pair of resilient members and each torque transmitting member includes a base portion for mounting on respective of the drive member and the driven member, first and second opposed wall sections extending axially from the base portion in spaced, parallel relationship on the opposite sides of the rotational axes, a first axially extending projection on each of the first projection on one of the torque transmitting members extending in spaced, parallel relationship to a corresponding first projection of the other torque transmitting member, and second axially extending projections on each of the second wall sections with the second projection on one of the transmitting members extending in spaced, parallel relationship to a corresponding second projection on the other torque transmitting member. The opposite ends of one of the resilient members are mounted on the first projections and the opposite ends of the other resilient member are mounted on the second projections.

In one embodiment, the wall sections terminate in edges which are spaced from each other to permit a predetermined amount of relative rotation of the torque transmitting members and which subsequently engage each other to prevent further relative rotation of the torque transmitting members.

In one embodiment, the edges of the wall sections include an engaging portion which extends at an acute angle to a plane intersecting the rotational axes and extending generally parallel to the longitudinal axes of the resilient members.

One of the principal features of the invention is provision of a simply constructed, compact drive coupling assembly for drivingly connecting together a rotatable drive member and a rotatable driven member, which assembly is capable of accommodating radial and/or angular misalignment between the rotational axes of the drive and driven members.

Another of the principal features of the invention is the provision of such a drive coupling assembly which is capable of effectively accommodating backlash.

A further of the principal features of the invention is the provision of such a drive coupling assembly which is arranged to employ generally conventional resilient shock isolation mounts.

Other features, aspects and advantages of the invention will become apparent to those skilled in the art upon reviewing the following detailed description, the drawing and the appended claims.

BRIEF DESCRIPTION OF THE DRAWING

FIG. 1 is a fragmentary perspective view of a drive coupling assembly incorporating various of the features of the invention, shown connecting together a drive member driven by an engine fly wheel and a clutch pulley.

FIG. 2 is a perspective, partially exploded view of the drive coupling assembly of FIG. 1, shown with the drive member and the clutch pulley removed.

FIG. 3 is a side elevation view of the drive coupling assembly of FIG. 1.

FIG. 4 is a sectional view taken generally along line 4—4 in FIG. 3.

Before explaining at least one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENTS

The drive coupling assembly of the invention is adaptable for drivingly connecting together a wide variety of rotatable drive and driven members. It is particularly adaptable for use in connecting together an adapter driven by a fly wheel of an internal combustion engine and a clutch pulley or the like and will be described in connection with that particular application.

Illustrated in the drawings is a drive assembly 10 including a rotatable drive member 12 such as an adapter driven by a fly wheel (not shown) of an internal combustion engine (not shown) and a rotatable driven member 14 such as a clutch pulley for a front end rotary mower unit (not shown) of a riding lawn mower. The drive member 12 is mounted for rotation about a first axis 16 and the driven member 14 is mounted for rotation about a second axis 18 which is generally coaxial with, but may be radially and/or angularly misaligned with the first axis 16 because of manufacturing tolerances or the like. The drive member 12 and the driven member 14 are drivingly connected together for common rotation by a drive coupling assembly 20 incorporating various of the features of the invention.

The drive coupling assembly 20 includes a first torque transmitting member 22 fixedly mounted on the drive member 12 for common rotation therewith, a second torque transmitting member 24 fixedly mounted on the driven member 14 for common rotation therewith, and one or more transversely extending resilient members 26. The resilient member(s) 26 drivingly connect together the torque transmitting members 22 and 24 so that torque is transmitted from the drive member 12 to the driven member 14 through the resilient member(s) 26 and any misalignment of the axes 16 and 18 is accommodated through a shearing action in the resilient member(s) 26.

While the torque transmitting members 22 and 24 can have a variety of different configurations, they preferably are identically arranged to simplify manufacture. In the specific and preferred construction illustrated, the drive coupling assembly 20 includes a pair of resilient members 26 and the torque transmitting members 22 and 24 are formed in a generally U-shape from sheet metal. Each torque transmitting member includes a generally rectangular base 28 and first and second opposed wall sections 30 and 32 which form the connecting portions for the resilient mount 26 and extend axially from the base section 28 in spaced parallel relationship. The base section 28 is mounted on the diameter of the drive member 12 or the driven member 14 by bolts 34 extending through apertures 36 in the base section 28 and threaded into the associated drive member 12 and driven member 14.

When the torque transmitting members 22 and 24 are installed, the wall sections 30 are generally equally spaced from the rotational axes 16 and 18. The first wall section 30 on the torque transmitting member 22 extends toward the second wall section 32 on the torque transmitting member 24 and the second wall section 32 on the torque transmitting member 22 extends toward the first wall section 30 on the torque transmitting member 24.

The first wall section 30 of the torque transmitting member 22 has a first axially extending connecting portion or projection 38a which extends in spaced, parallel relationship to a corresponding axialy extending connecting portion 38b on the first wall section 30 of the other torque transmitting member 24. Similarly, the second wall section 32 of the torque transmitting member 22 has a second axially extending connecting portion or projection 40a which extends in spaced, parallel relationship to a corresponding second axially extending connecting portion or projection 40b on the second wall section 32 of the other torque transmitting member 24. The first and second wall sections 30 and 32 terminate in edges 39 and 41 which are spaced a small distance apart to permit limited relative rotation of the torque transmitting members 22 and 24 as explained in more detail below.

While various arrangements can be used, in the specific construction illustrated, the resilient members 26 are generally conventional, elongate shock isolation mounts. More specifically, each resilient member 26 has a generally cylindrical body 42 made from an elastomeric material, such as neoprene rubber, and having a longitudinal axis 43, a male threaded mount 44 on one end and a female threaded mount 46 on the opposite end. The mounts 44 and 46 preferably are secured to the body 42 coaxially with the longitudinal axis 43 by molding the body material about the mounts.

As best shown in FIG. 4, one resilient member 26 (upper one) extends transversely between the first projections 38a and 38b and the other resilient member 26 (lower one) extends transversely between the second projections 40a and 40b. The resilient members 26 are positioned at diametrically opposed locations relative to the rotational axes 16 and 18 and their longitudinal axes 43 are generally perpendicular to a medial plane 47 intersecting the rotational axes 16 and 18.

One end of the upper resilient member 26 is fixedly mounted on the first projection 38b of the torque transmitting member 24 by a bolt 48 extending through an aperture in the projection b and threaded into the female mount 46. The opposite end of the upper resilient member 26 is fixedly mounted on the first projection a of the torque transmitting member 22 by a nut 50 threaded onto the male mount 44 which extends through an aperture in the projection 38A.

One end of the lower resilient mount 26 is fixedly mounted on the second projection 40a of the torque transmitting member 22 by a nut 52 threaded onto the male mount 44 which extends through an aperture in the projection 40a. The opposite end of the lower resilient mount 26 is fixedly mounted on the second projection 40b of the torque transmitting member 24 by a bolt 54 extending through an aperture in the projection 40b and threaded into the female mount 46.

In operation, the driving member 12 preferably is rotated in the clockwise direction as viewed in FIGS. 1 and 2. The spacing between the edges 39 and 41 of the first and second wall sections 30 and 32 afford transmission of rotational torque from the driving member 12 to the driven member 14 through compression of the resilient members 26. The resilient members 26 can accommodate angular and/or radial misalignment of the rotational axes 16 and 18, primarily through a shearing action in the elastomeric material of the bodies 42.

Reverse rotation of one of the drive and driven members 12 and 14 relative to the other, such as counterclockwise rotation of the drive member 12 resulting from the engine backfiring, causes a stretching or elongation of the resilient members 26. If this elongation is excessive, the elastomeric material of the body 42 can be pulled away from the mounts 44 and 46.

Means are provided for limiting reverse rotation of one torque transmitting member relative to the other. In the specific construction illustrated, the edges 39 and 41 of the first and second wall sections 30 and 32 extend in planes 56 perpendicularly intersecting the longitudinal axes 43 of the resilient members 26. The edges 39 and 41 include juxtaposed portions which engage after a predetermined elongation of the resilient members 26 and prevent further reverse rotation of one torque transmitting member relative to the other. More specifically, the edges 39 and 41 have respective inclined portions 58 and 60 which extend at an acute angle to a plane 62 extending through the longitudinal axes 43 of the resilient member 26 generally perpendicular to the rotational axes 16 and 18. The inclined edge portions 58 and 60 are spaced apart to permit an amount of rotational movement of the torque transmitting member 22 relative to the torque transmitting member 24 in the counterclockwise direction corresponding to a predetermined elongation (e.g. up to 100–150%) of the resilient members 26. The inclined edge portions 58 and 60 on the torque transmitting member 22 then engage the corresponding inclined edge portions 58 and 60 on the torque transmitting member 24 to prevent further relative counterclockwise rotation of the torque transmitting member 22.

While less preferred, the drive member 12 can be rotated in the counterclockwise direction. In that case, torque is transmitted from the drive member 12 to the driven member 14 through an elongation of the resilient members 26 and the edge portions 58 and 60 engage to prevent excessive elongation of the resilient members 26.

As viewed in FIG. 3, the edge portions 58 and 60 of the torque transmitting members can extend horizontally rather than being inclined.

From the above description, it can been seen that the drive coupling and assembly provided by the invention has a simple, compact construction, includes simple means for accommodating backlash and, while a larger number of resilient mounts can be used, as few as two can be used to accommodate both angular and radial misalignment.

Various of the features of the invention are set forth in the following claims:

I claim:

1. A drive coupling assembly for drivingly connecting together a drive member mounted for rotation about a first axis and a driven member mounted for rotation about a second axis generally coaxial with the first axis, said drive coupling assembly including a first torque transmitting member adapted for connection to the drive member for common rotation therewith and having a first connection portion radially spaced from the first rotational axis and extending axially toward the driven member, a second torque transmitting member adapted for connection to the driven member for common rotation therewith and having a second connection portion radially spaced from the second rotational axis and extending axially toward the drive member in radially spaced relationship with said first connection portion, a resilient member extending between said first and second connection portions transversely of the rotational axes and having opposite ends, and means fixedly mounting the opposite ends of said resilient member on said first and second connection portions at locations radially spaced from the rotational axes so that torque is transmitted from the drive member to the driven member through said resilient member.

2. A drive coupling assembly according to claim 1 including means for limiting the amount of relative rotational movement between said first and second torque transmitting members.

3. A drive coupling assembly according to claim 1 wherein said drive member is rotated in a direction whereby torque is transmitted from said drive member through compression of said resilient member.

4. A drive coupling assembly according to claim 1 including a pair of said resilient members and wherein each of said first and second torque transmitting members includes a base portion for mounting on respective of the drive and driven members, wherein said connecting portions include first and second opposed wall sections extending axially from said base portion in spaced, parallel relationship on the opposite sides of the rotational axes with the first wall section on one of said torque transmitting members extending toward the second wall section of the other of said torque transmitting members, a first axially extending projection on each of said first wall sections, the first projection of one of said torque transmitting members extending in spaced, parallel relationship to the first projection on the other of said torque transmitting members, and second axially extending projections on each of said second wall sections, the second projection on one of said torque transmitting members extending in spaced, parallel relationship to the second projection on the other of said torque transmitting members, wherein the opposite ends of one of said resilient members are mounted on said first projections, and wherein the opposite ends of another of said resilient members are mounted on said second projections.

5. A drive coupling assembly according to claim 4 and further including means for limiting relative rotational movement between said torque transmitting members and comprising each of said first wall section terminating in a first edge and each of second wall sections terminate in a second edge, said first and second edges being spaced from each other to permit a predetermined amount of relative rotational movement between said first and second torque transmitting members and to subsequently engage and prevent further relative rotational movement of said first and second torque transmitting members.

6. A drive coupling assembly according to claim 5 wherein the spacing between said first and second edges permits an amount of rotational movement of one of said torque transmitting members relative to the other corresponding to a predetermined elongation of said resilient members.

7. A drive coupling assembly according to claim 6 wherein said resilient members include an elongated body of elastomeric material and having a longitudinal axis and wherein said first and second edges extend in a plane perpendicularly intersecting the longitudinal axes of said resilient members.

8. A drive coupling assembly according to claim 7 wherein said first and second edges include engaging portions extending at an acute angle to a plane extending through the longitudinal axes of said resilient mounts generally perpendicularly to the rotational axes.

9. A drive coupling assembly for drivingly connecting together a drive member mounted for rotation about a first axis and a driven member mounted for rotation about a second axis generally coaxial with the first axis, said drive coupling assembly including a first torque transmitting member adapted for connection to the drive member for common rotation therewith and having a first connection portion radially spaced from the first rotational axis and extending axially toward the driven member, a second torque transmitting member adapted for connection to the driven member for common rotation therewith and having a second connection portion radially spaced from the second rotational axis and extending axially toward the drive member in radially spaced relationship with said first connection portion, a pair of resilient members extending between said first and second connection portions and transversely of the rotational axes, and having opposite ends, means fixedly mounting the opposite ends of said resilient members on said first and second connection portions at locations radially spaced from the rotational axes so that, when the drive member is rotated in one direction, torque is transmitted from the drive member to the driven member through compression of said resilient members, and means for limiting the amount of relative rotational movement between said first and second torque transmitting members.

10. A drive coupling assembly according to claim 9 including a pair of said resilient members and wherein each of said first and second torque transmitting members includes a base portion for mounting on respective of the drive and driven members, wherein said connecting portions include first and second opposed wall sections extending axially from said base portion in spaced, parallel relationship on the opposite sides of the rotational axes with the first wall section on one of said torque transmitting members extending toward the second wall section of the other of said torque transmitting members, a first axially extending projection on each of said first wall sections, the first projection of one of said torque transmitting members extending in spaced, parallel relationship to the first projection on the other of said torque transmitting members, and second axially extending projections on each of said second wall sections, the second projection on one of said torque transmitting members extending in spaced, parallel relationship to the second projection on the other of said torque transmitting members, wherein the opposite ends of one of said resilient members are mounted on said first projections, wherein the opposite ends of another of said resilient members are mounted on said second projections, and wherein said means for limiting relative rotational movement between said torque transmitting members comprises each of said first wall sections terminating in a first edge and each of second wall sections terminating in a second edge, said first and second edges being spaced from each other to permit a predetermined amount of relative rotational movement between said first and second torque transmitting members and to subsequently engage and prevent further relative rotational movement of said first and second torque transmitting members, the spacing between said first and second edges permitting an amount of rotational movement of one of said torque transmitting members relative to the other corresponding to a predetermined elongation of said resilient members.

11. A drive coupling assembly according to claim 10 wherein said resilient members include an elongated body of elastomeric material and have a longitudinal axis, and wherein said first and second edges extend in a plane perpendicularly intersecting the longitudinal axes of said resilient members and include engaging portions extending at an acute angle to a plane extending through the longitudinal axes of said resilient mounts generally perpendicularly to the rotational axes.

* * * * *